United States Patent
Jones

(10) Patent No.: US 6,526,574 B1
(45) Date of Patent: Feb. 25, 2003

(54) SYSTEM FOR FINDING DIFFERENCES BETWEEN TWO COMPUTER FILES AND UPDATING THE COMPUTER FILES

(75) Inventor: Kerry N Jones, Muncie, IN (US)

(73) Assignee: Pocket Soft, Inc., Houston, TX (US)

( * ) Notice: Subject to any disclaimer, the term of this patent is extended or adjusted under 35 U.S.C. 154(b) by 0 days.

(21) Appl. No.: 09/463,035

(22) PCT Filed: Jul. 15, 1998

(86) PCT No.: PCT/US98/14433
§ 371 (c)(1),
(2), (4) Date: Jan. 17, 2000

(87) PCT Pub. No.: WO99/04336
PCT Pub. Date: Jan. 28, 1999

Related U.S. Application Data

(60) Provisional application No. 60/052,584, filed on Jul. 15, 1997.

(51) Int. Cl.[7] ................................................. G06F 9/44
(52) U.S. Cl. ...................... 717/168; 717/169; 717/171; 717/172; 717/167; 707/511; 707/101; 382/246
(58) Field of Search ......................... 717/167, 168–173; 707/203, 10, 1, 101, 511, 100, 2; 341/65, 50, 51; 382/232, 244, 246; 709/221, 203

(56) References Cited

U.S. PATENT DOCUMENTS

| | | | | |
|---|---|---|---|---|
| 5,155,847 A | * | 10/1992 | Kirouac et al. .............. | 709/221 |
| 5,359,730 A | * | 10/1994 | Marron ........................ | 709/100 |
| 5,479,654 A | * | 12/1995 | Squibb ......................... | 707/201 |
| 5,481,713 A | * | 1/1996 | Wetmore et al. ............. | 717/170 |
| 5,659,755 A | * | 8/1997 | Strohacker .................... | 341/51 |
| 5,745,906 A | * | 4/1998 | Squibb ......................... | 707/203 |
| 5,752,039 A | * | 5/1998 | Tanimura ..................... | 707/203 |
| 5,832,520 A | * | 11/1998 | Miller .......................... | 707/203 |
| 6,049,672 A | * | 4/2000 | Shiell et al. ................. | 711/102 |
| 6,052,531 A | * | 4/2000 | Waldin, Jr. et al. .......... | 717/170 |
| 6,135,651 A | * | 10/2000 | Leinfelder et al. ........... | 717/168 |
| 6,243,766 B1 | * | 6/2001 | Sliger et al. .................... | 710/2 |
| 6,289,509 B1 | * | 9/2001 | Kryloff ......................... | 717/170 |
| 6,374,250 B2 | * | 4/2002 | Ajtai et al. .................... | 341/50 |
| 6,397,385 B1 | * | 5/2002 | Kravitz ......................... | 717/173 |
| 6,466,999 B1 | * | 10/2002 | Sliger et al. ................... | 710/68 |

OTHER PUBLICATIONS

Title: A technique for isolating differences between files, author: Paul Heckel, source: ACM, Apr. 1978.*
Title: Ovelapped patch elimination algorithm for deformable mesh video coding, Yung Ming Chou; Hsueh Ming Hang, IEEE, Jun. 19, 1997.*

* cited by examiner

Primary Examiner—Gregory Morse
Assistant Examiner—Chameli C. Das
(74) Attorney, Agent, or Firm—Browning Bushman P.C.

(57) ABSTRACT

A computer file update or patch process involves building a Patch File. The existing or original file (the OLD file) and the revised file (the NEW file) are input into a Patch Build program. The differences in the OLD file and the NEW file are determined by the Patch Build program, and this information is output by the Patch Build program as a Patch File. The Patch File is distributed, along with a Patch Apply program, to end users so that the OLD file is efficiently converted to the desired, updated NEW file. The OLD file and the Patch File are input by the end user into the Patch Apply program. The Patch Apply program changes, at the bit level, only the portions of the OLD file required to yield the desired file update. By distributing only the Patch File and Patch Apply program to the end users, the desired file update can be implemented by the end user with maximum operational and economic efficiency. Furthermore, the update is implemented with numerous safety features including (1) automatic verification that the correct files have been used and that the patches have been built and applied correctly, (2) automatic check for sufficient disk space, (3) restart capability after power failure, (4) backup of any files affected by a patch, and (5) the ability to reverse the patched file or an entire system to the prior condition.

38 Claims, 7 Drawing Sheets

SYSTEM FOR FINDING DIFFERENCES BETWEEN TWO COMPUTER FILES AND UPDATING THE COMPUTER FILES

This application is a national strategy entry of PCT/US 98/166633, International filing date Jul. 15, 1998 which claim benefit of No. 60/052,584, Jul. 15, 1997.

BACKGROUND OF THE INVENTION

This invention is directed toward apparatus and methods for updating existing computer files. More particularly, the invention is directed toward methods and apparatus for identifying only the portion of the file to be changed, forming a patch program to implement the change at the bit level, and forming a Patch Apply program to implement the desired changes in the existing file thereby forming a revised file, meaning a NEW or updated file.

BACKGROUND OF THE ART

The changing or "updating" of files is a normal process in computer science. Application files are routinely updated as technology advances and improvements are developed. Application files are also frequently updated to eliminate bugs that are found during usage. Data files are typically modified as new data are acquired, or old data are determined to be invalid. Files comprising text are also routinely modified for numerous reasons well known in the art.

Traditionally, changes in files have been implemented by creating a completely NEW file containing all desired changes, and distributing this full, modified file to all users to be downloaded to replace the existing file. Distribution of a completely new version of the file is costly to the provider. Reinstallation of the new version is costly to the end users. Often, the initial version of the file is lost, and cannot be retrieved for economic or technical reasons. Reinstallation is bandwidth or media intensive for the end user.

File "patching" techniques have been used in the prior art to revise existing files. The administration of these techniques is complex, and installation of the patch is often as involved technically and economically as the installation of a fully revised version of the file.

In view of the previously described methodology and prior art, an object of this invention is to provide a system to modify or patch an existing file at the bit level and only in those areas of the file requiring modification.

Another object of the invention is to provide a system for easily building a patch, and easily installing the patch.

Yet another object of the invention is to provide a system for finding the difference between an existing computer file and an updated version of the file using a fixed amount of memory, and using these differences to implement the desired update of the existing file.

Another object of the invention is to provide a patch system which works with a single file, with a group of files, with directories, and with directory trees.

Still another object of the present invention is to provide a patch system for an existing file which can be used to fix bugs, implement program changes, implement data and text revisions while providing an error checking system and a backup system which allows the user to restore the original existing file.

Yet another object of the invention is to provide a system with which multiple changes or patches can be made in an existing file with a single application of the system.

There are other objects and advantages of the present invention which will become apparent in the following disclosure.

SUMMARY OF THE INVENTION

The first step in the computer file update or patch process involves the building of a Patch File. The existing or original file, which will be referred to as the OLD file, and the revised file, which will be referred as the NEW file, are input into a Patch Build program. The differences in the OLD file and the NEW file are determined by the Patch Build program, and this information is output by the Patch Build program as a Patch File. Operation of the Patch Build program will be disclosed in detail in a subsequent section. The changes required to convert the OLD input file to the NEW input file are transferred as the Patch File.

The next step in the computer file patch involves the distribution of the Patch File, along with a Patch Apply program, to the end users so that the OLD file (wherever located) is efficiently converted to the desired, updated NEW file. The OLD file and the Patch File are input by the end user into the Patch Apply program. The Patch Apply program changes, at the bit level, only the portions of the OLD file required to yield the desired file update. The updated file is therefore output from the Patch Apply program yielding the desired NEW file at the user level.

By distributing only the Patch File and Patch Apply program to the end users, the desired file update can be implemented by the end user with maximum operational and economic efficiency. Furthermore, the update is implemented with numerous safety features including (1) automatic verification that the correct files have been used and that the patches have been built and applied correctly, (2) automatic check for sufficient disk space, (3) restart capability after power failure, (4) backup of any files affected by a patch, and (5) the ability to reverse the patched file or an entire system to the prior condition.

BRIEF DESCRIPTION OF THE DRAWINGS

So that the manner in which the above recited features, advantages and objectives of the present invention are attained and can be understood in detail, more particular description of the invention, briefly summarized above, may be had by reference to the appended drawings. It is noted, however, that the appended drawings illustrate only typical embodiments of the invention and therefor not to be considered limiting in scope, for the invention may admit to other equally effective embodiments.

DETAILED DESCRIPTION OF THE PREFERRED EMBODIMENTS

Figure 1A:
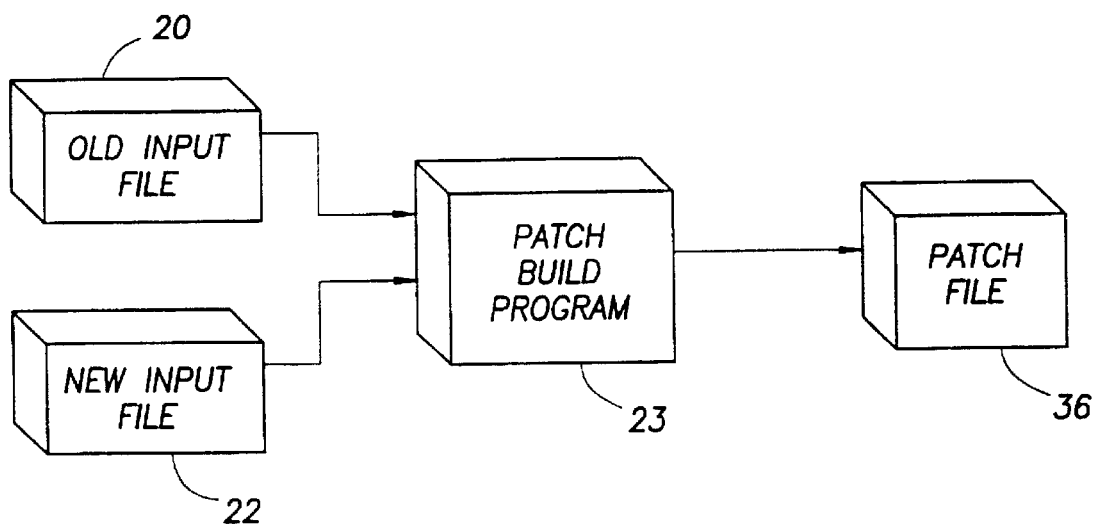
FIGS. 1a and 1b disclose a conceptual overview of the invention.
Figure 1B:
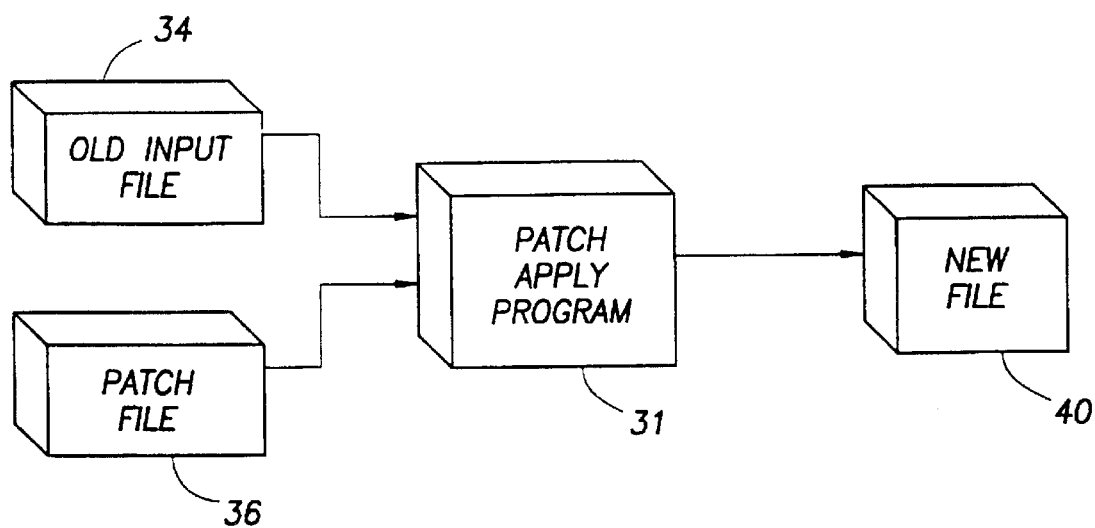

FIGS. 1a and 1b present a conceptual overview of the invention. For purposes of discussion, it will be assumed that software updates or revisions are distributed (by mailing a disc, by downloading or otherwise) to multiple end users from a central organization location. As an example, a software company may formulate an updated file version, and create the associated Patch File (along with the Patch Apply program), at its headquarters facility. This will be referred to as the "central" facility. Copies of the Patch File and Patch Apply program then are distributed to the company's customer user base so that the customers can update their existing files at their locations. These will be referred to as "end user locations". The NEW file used to create the Patch File at the central facility will sometimes be referred to as the NEW "template" file in order to distinguish this copy of the NEW file from subsequent copies of NEW files generated at remote locations by conversion of remotely distributed OLD files.

FIG. 1a conceptually illustrates activities at the central facility. The original file, which is referred to as the OLD input file 20, is input into a Patch Build program 23. The revised file, which is referred to as the NEW input file 22, is also input into PATCH Build program 23. The differences in the OLD input file 20 and the NEW input file 22 are determined by the Patch Build program 23 as will be detailed in subsequent sections of this disclosure. The output of the Patch Build program is a Patch File 36. The Patch File 36 contains only the changes required to convert the OLD input file 20 to the desired NEW input file 22, and is readily distributed to end user locations.

FIG. 1b conceptually illustrates activities at one of typically a plurality of end user locations. The Patch File 36, along with the end users version of the OLD input file 34, is input into a Patch Apply program 31. While the OLD files are identical, the numeral 20 is used to designate this file copy at the central location and the numeral 34 is used to designate the duplicate copies at the end user locations. The Patch Apply program 31 is typically created at the central facility and distributed to the end user locations. As illustrated in FIG. 1b, it converts the end users OLD file 34, with the help of the Patch File 36 into the desired, updated New file 40 at the end user's facility. The Patch Apply program 31 changes, at the bit level, only the portions of the OLD file 34 required to yield the desired file update as will be described in detail in a subsequent section of this disclosure. The resulting NEW file 40 is, therefore, output from the Patch Apply program 31 and is the same as the NEW file 22 at the central location, but it is identified with the numeral 40 to emphasize that the conversion is made at the end user's facility.

Figure 2:
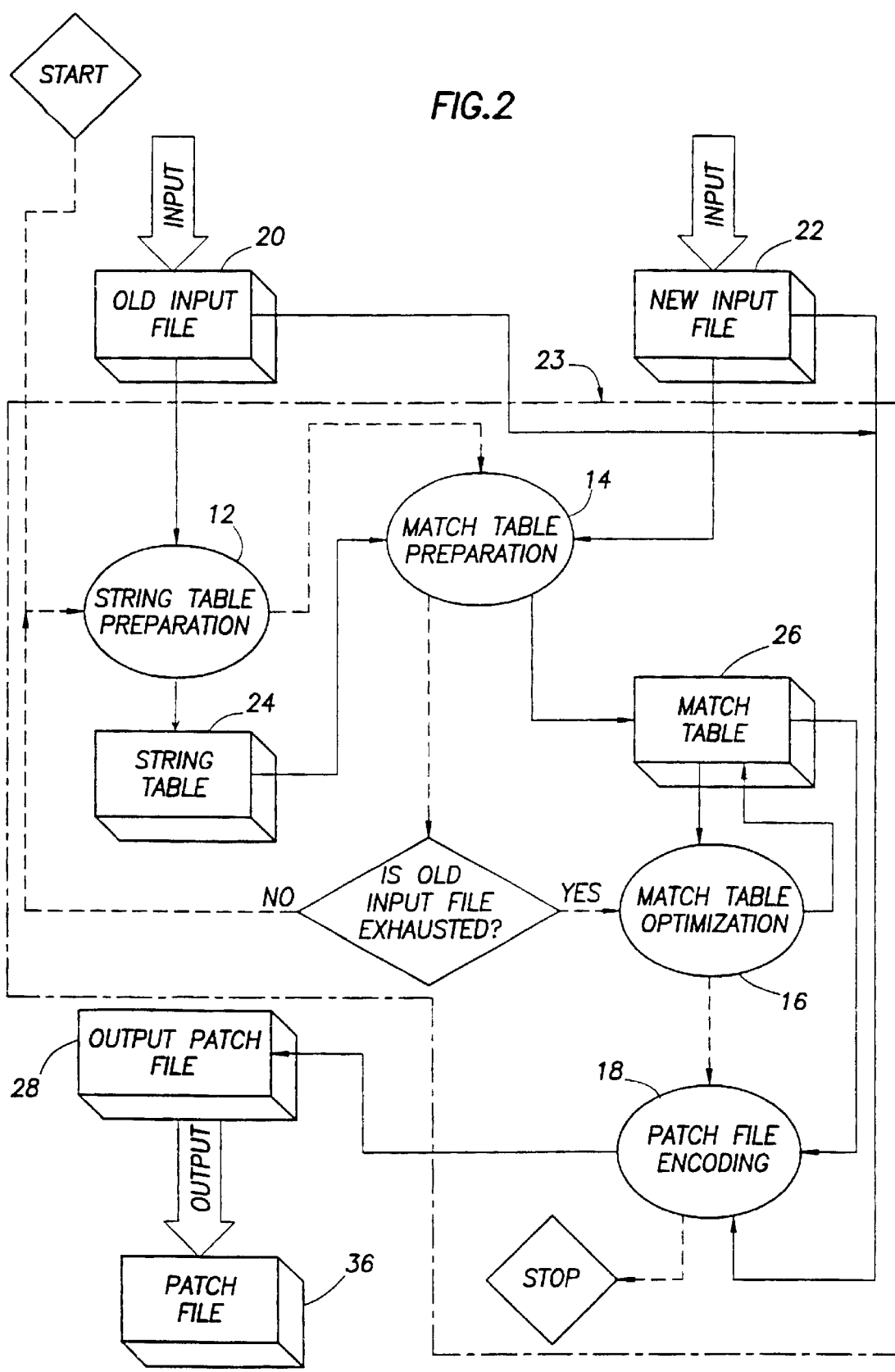
FIG. 2 is a flow chart of the patch build program used to create the Patch File.

FIG. 2 illustrates the patch construction process in more detail. Elements of the Patch Build program 23 are enclosed within the broken line boundary as indicated. The OLD input file 20 is input to a string table coding circuit 12 forming a string table output to a matching circuit 14. Both circuits are explained in detail below. The match table circuit has an input of the entire NEW input file 22; in conjunction with the stored string table 24, the match table circuit produces the match table 26, which is retained in a suitably sized match table storage means, a conventional memory module. The operations of string table circuit coding and match table coding alternate until all of the OLD input file 20 has been processed by the string table circuit 12, and the stored string table 24 has been processed into the match table circuit 14. The stored match table data is output to the match table optimization circuit 16 to alter it. When this process is completed, the OLD input file 20, the NEW File 22 and the match table memory 26 are input to a patch file encoding circuit 18 which serially passes the completed patch file 36 to a patch file output means 28.

Figure 3:
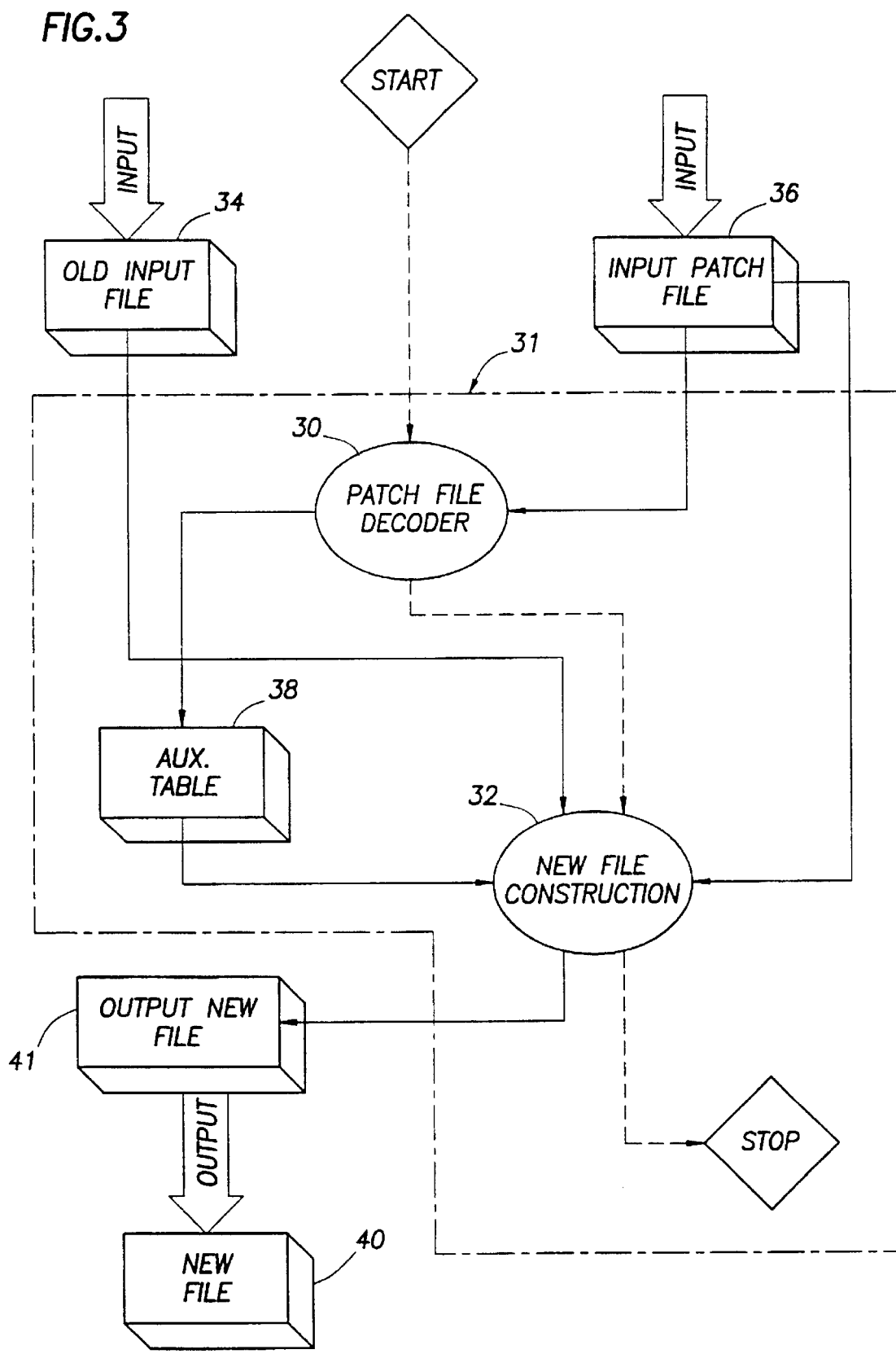
FIG. 3 is a patch apply flow chart forming a NEW file.

FIG. 3 illustrates the NEW file generation process at typical multiple end user locations. Elements of the patch apply program 31 are enclosed within the broken line boundary as indicated. The patch file 36 is taken from the input means to a patch file decoder 30, which produces an auxiliary table 38, retained in the auxiliary table memory. Concurrent with this process, a NEW file construction converter circuit 32 reads serially the portions of the auxiliary table 38 from memory while it is being constructed, as well as the input patch file 36 and the OLD input file 34, and then serially sends the NEW file 40 to an output means 41.

Figure 4:
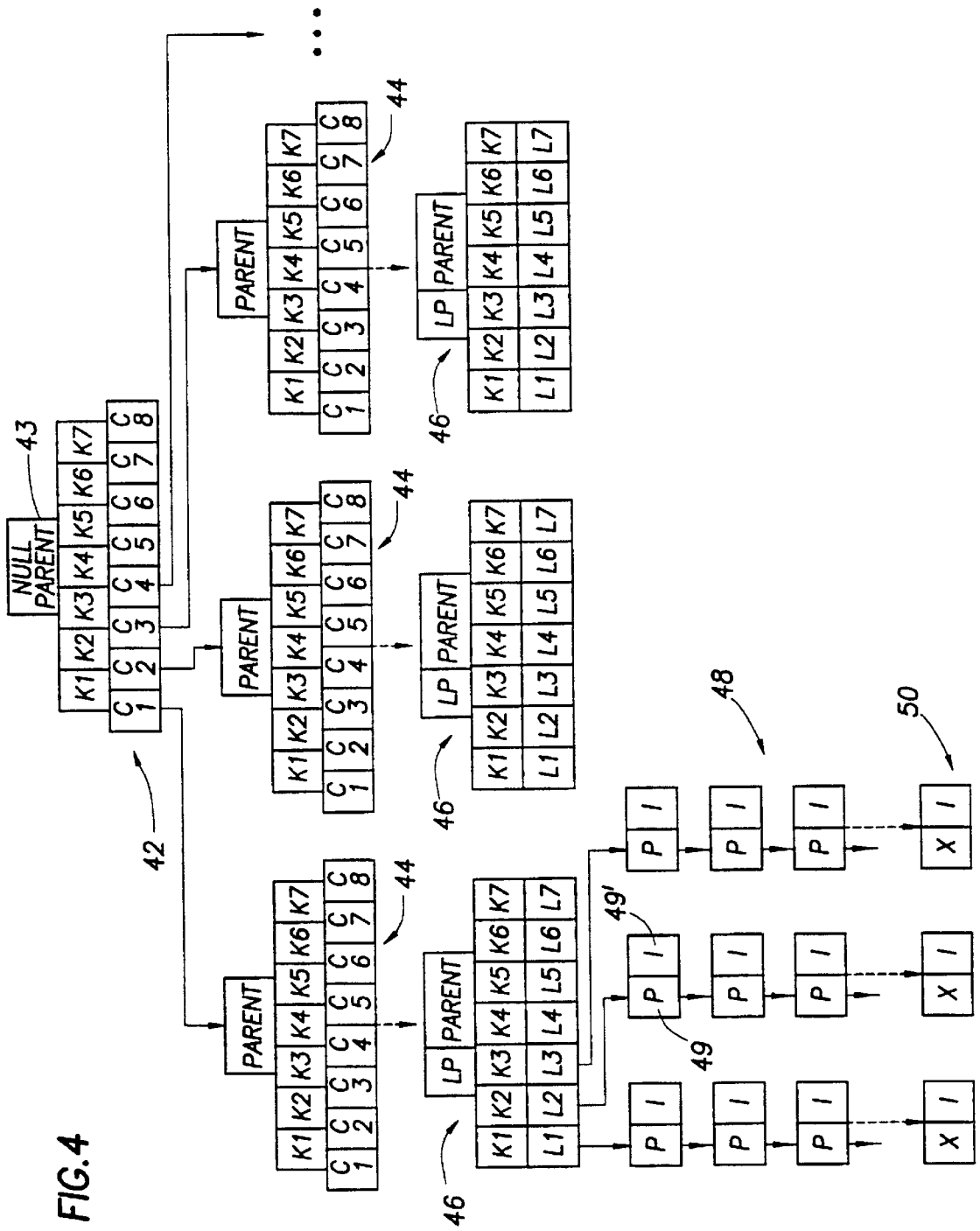
FIG. 4 illustrates a string table in the preferred embodiment.

Referring now to FIG. 4 and FIG. 2, the string table 24 is a modified 8-way B-tree containing a plurality of nodes of five different types. As shown in FIG. 4, a root node 42, only one is needed, contains up to seven keys (labeled K1 through K7) and up to eight child pointers (labeled C1 through C8) which identify an interior node 44 or a leaf node 46, and an empty "parent" node 43, all in the root node 42. Each interior node 44 (there may be none or a plurality), contains the same information as the root node 42, but with the addition of a parent pointer. The unique root node 42 and interior node 44 contain a child pointer identifying the interior node 44 in question. Each leaf node 46 (there may be none or several) is identified by its location at a fixed distance (measured by the number of child pointers that must be traversed to it) from the root node and contains up to seven keys (again labeled K1 through K7) and corresponding list pointers (labeled 11 through 17), which each identify a list entry 48 or list terminator 50; also the same parent information as the interior node and an additional field denoted LP (a list entry 48 or list terminator 50) corresponds to one of the keys in one of the parents of the leaf node 46. The method for associating each key in an internal node 44 or root node 42 with an LP field in a leaf node 46 is described in the subsequent section entitled "operation". Each list entry 48, of which there may be none or a plurality, contains an instance field 49' (labeled i), which identifies a location of the corresponding key in the OLD file, and a pointer field 49 (labeled P), which identifies a list entry 48 or list terminator 50 corresponding to the next instance of the same key. Each list terminator 50, of which there may be none or a plurality, contains the same instance field as a list entry, but is identified by an empty pointer 50' (labeled x) indicating the end of the list of instances of the corresponding key.

The match table 26 (shown in FIG. 2) is a rectangular array with four columns and rows equal to the number of "chunks" in the NEW input file 22, where a "chunk" is a fixed-size portion of the file (required to be a power of 2) and is an operational parameter of the overall patch file construction process illustrated in FIG. 2. Table 1 illustrates a match table.

TABLE 1

| Match table | | | |
| --- | --- | --- | --- |
| $I_1$ | $L_1$ | $RL_1$ | $S_1$ |
| $I_2$ | $L_2$ | $RL_2$ | $S_2$ |
| $I_3$ | $L_3$ | $RL_3$ | $S_3$ |
| $I_4$ | $L_4$ | $RL_4$ | $S_4$ |
| . | . | . | . |
| . | . | . | . |
| . | . | . | . |
| $I_x$ | $L_x$ | $RL_x$ | $S_x$ |

The four columns labeled I, L, RL and S (and all encode parameters) relate to a possible match for this "chunk" in the OLD Input file 20. The L column identifies the number of consecutive characters in the OLD Input file 20 starting at the position identified by the I column that match (at least approximately) the characters starting at the beginning of the "chunk" in the NEW Input file 22. The RL column identifies the number of consecutive characters in the OLD Input file 20 before the position identified in the I column that match (at least approximately) the characters before this "chunk" in the NEW Input file 22. If no match has been located for this "chunk" then the L and RL columns both contain 0. If this "chunk" has been identified as a candidate for special handling described in the subsequent "Operation", then the RL column will contain one of several possible special handling markers (also described in a subsequent section). The S column contains different values at different times. During the match table preparation shown in FIG. 2, the S column contains an estimate of the number of characters required to encode this approximate match, together with the mismatches that occur within it. During the match table Optimization process 16 shown in FIG. 2, the S column is gradually converted to an estimate of the total number of characters required to encode the patch file from this "chunk" to the end.

Figure 8:
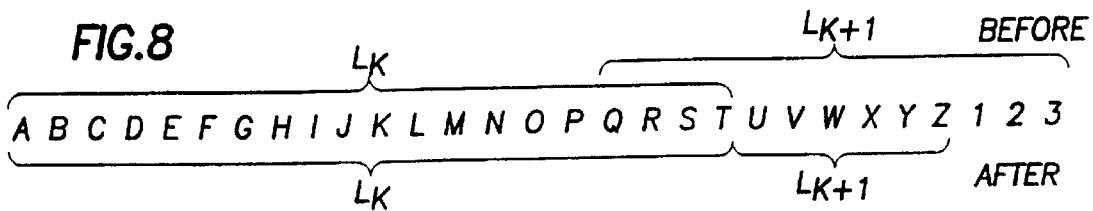
FIG. 8 shows in broad sweeps of the operation of the match table preparation.

FIG. 8 of the drawings shows in broad sweep the operation of the match table preparation. Referring to table 1 given above, FIG. 8 includes a first set of prospective or tentative matches. At the top of FIG. 8, assume that approximate matches have been indicated in the series of matches which are $L_1 \ldots L_x$. These matches may overlap, and FIG. 8 intentionally shows such an overlap. This occurs at a preliminary state of affairs. This occurs before optimization.

As shown in FIG. 8, the preliminary stage may well include several tentative matches in adjacent blocks. Without regard to the blocks, without regard to the length as measured looking to the left or looking to the right, without regard to the values of $L_1$ or the value of $RL_1$, there may be an overlap at an early stage of approximation. At the end however the approximation is terminated so that the adjacent values of $L_k$ and also $L_{k+1}$ are adjusted so that overlap is removed. To provide this graphically so that an understanding can be obtained, FIG. 8 shows a representative file and also shows the overlap of adjacent blocks. At the conclusion of the optimization process, the overlap is eliminated. In the upper part of FIG. 8, the brackets are shown with an overlap while the optimization process removes the overlap so that the entries in the match table $L_k$ and $L_{k+1}$ no longer overlap.

Based on the foregoing it would then be observed that the operation of the optimization process ultimately continues until the position identified in the I column builds into the entire file has been handled and matches are now evaluated and are optimized. Since precise definition then prevails at the end of the process, the content of Table 1 is simplified. Effectively, of Table 1 is reduced to a series of entries which still includes the I column. The aggregate length of a given entry will then be different, and the S column will likewise be modified, all is explained below.

Figure 5:
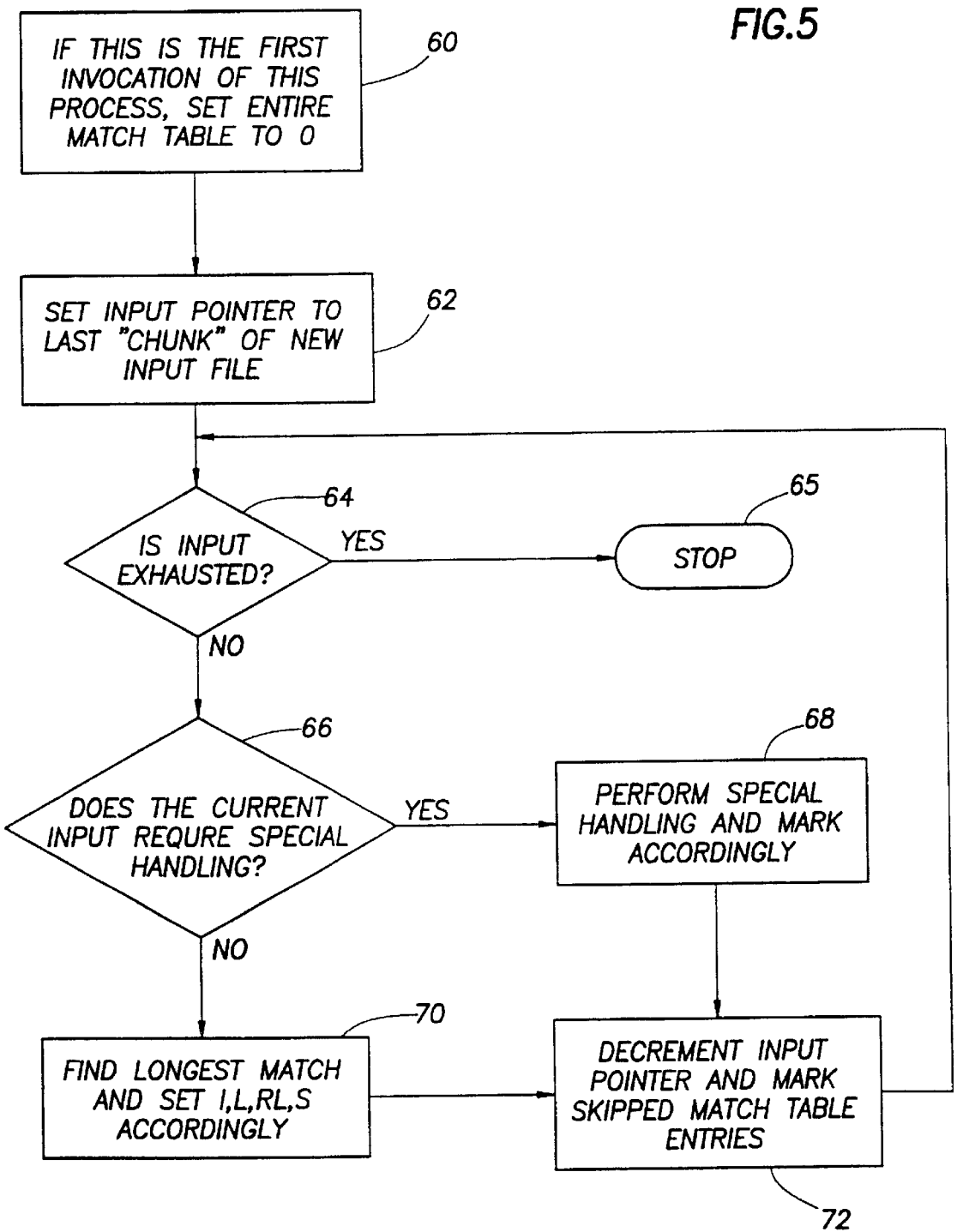
FIG. 5 is a flow chart of the preparation of the string Table.

FIG. 5 is a flowchart that describes the match table preparation 14. This process (as shown in FIG. 2) uses a completed string table 24 and a NEW input file 22 as inputs to form a prepared (or updated) match table 26 output. The method proceeds by passing the NEW input file 22 backward, a "chunk" at a time. Recall that a "chunk" is a fixed-size portion of the file (size is a power of 2) and is an operational parameter of the overall patch file construction process. The match table is initially set to "0" at step 60 and a set pointer is set to the last "chunk" of NEW input data at step 62. As each "chunk" is processed, it is checked at step 64 to see if the string of input "chunk" has been exhausted. If exhausted, the process is stopped at step 65. The next step in the method is to check this "chunk" for special handling at step 66. If special handling is warranted, this is marked in the match table at step 68 and the entire contiguous set of "chunks" to which the special handling applies is marked and skipped at step 72. This step will be expanded in the subsequent section entitled "Operation". If special handling is not warranted, the string table 24 is consulted to locate all the instances in the current portion of the OLD Input file 20 that exactly matches the current "chunk" of the NEW Input file 22. Each instance is examined at step 70 and extended forward and backward to locate the largest current (possibly approximate) match, where "largest" means the longest match in the forward direction with the length in the reverse direction used to break ties. The largest current match is then compared to the match for this "chunk" already marked in the match table (from processing previous portions of the OLD Input file 20). If the largest current match is longer in the forward direction than the previously marked match or has the same forward length (plus a longer reverse length), the largest current match is marked in the match table and all "chunks" contained within the extent of the reverse portion of this match are marked and skipped at step 72. If there is no current match found, or if the largest current match is smaller than the previously marked match, then the match table is not altered for this "chunk." In this case, if approximate matching is being used (or if there is no previously marked match for this "chunk"), the NEW Input file 22 is moved to the next "chunk", in the reverse direction, and again checked at step 64 to see if the input list is exhausted. If exact matching is being used, then all "chunks"0 contained within the extent of the reverse portion of the previously marked match are skipped. This entire process is repeated until the NEW input file 22 is exhausted as determined at stop 64. That is, the input file is exhausted when the first "chunk" of the file has been processed.

Figure 6:
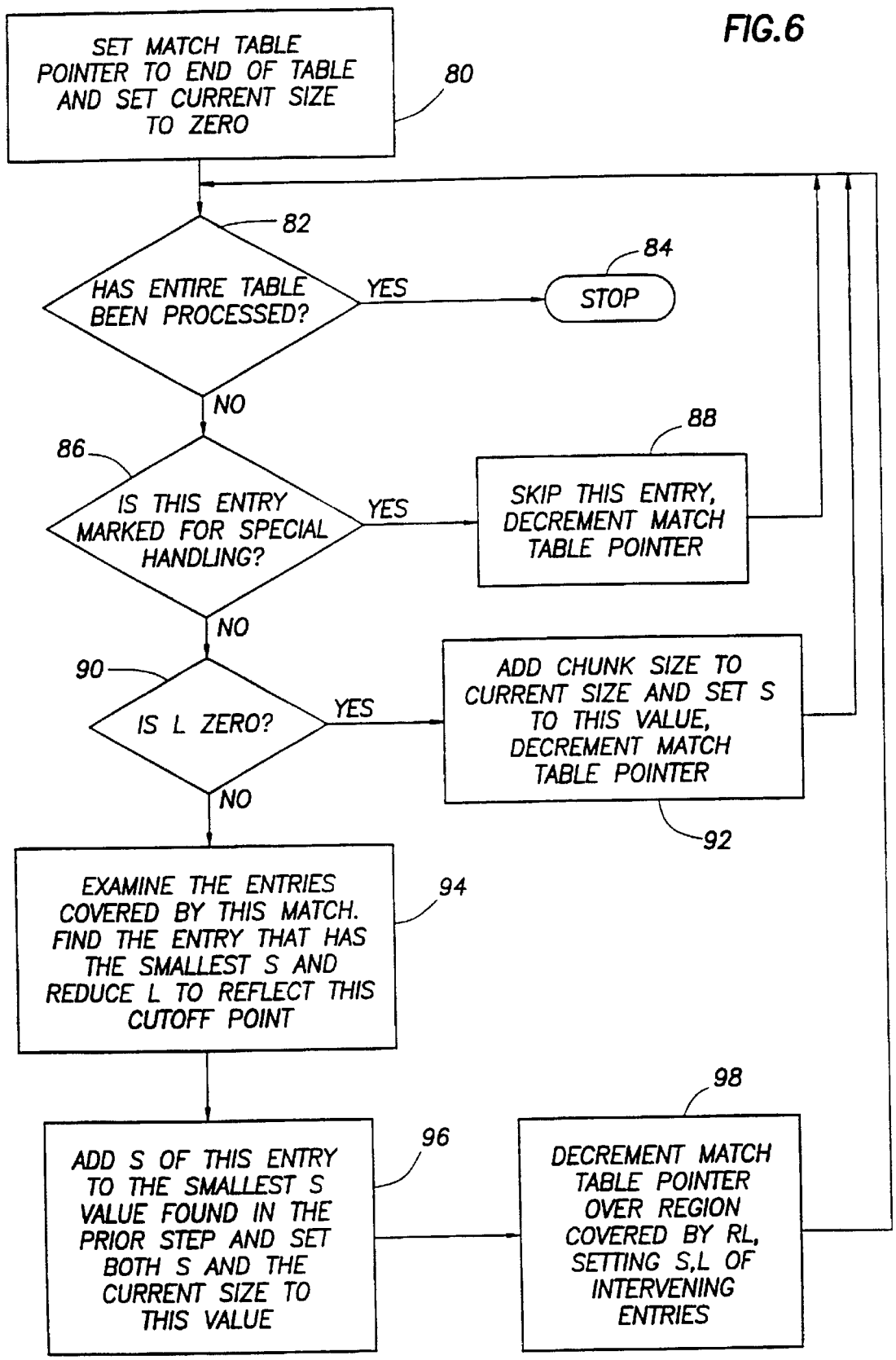
FIG. 6 is a match table optimization flow chart.

The match table optimization process 16 is shown as a whole in FIG. 2. Details of the steps in match table optimization are shown in FIG. 6. This process operates entirely on the match table 26 without reference to any other data structures. The method begins by setting the current size to zero at step 80, and then proceeds by passing the match table 26 "backward" beginning with the row corresponding to the last "chunk" in the NEW input file 22. If a row corresponds to a special handling "chunk" as determined at step 90, then it is skipped. The value of L is checked at step 86. If a row has an L value of zero, thereby indicating that no match was ever located, then the "chunk" size is added to the current size and S of this row is set to that value at step 88. In this case, the next row is then examined in the reverse direction, checking at step 82 to see if the entire table has been processed. However, if the value of L for this row is nonzero, then the rows corresponding to "chunks" within the forward extent of the match described in this row are examined at step 94, and the one with the smallest value of S is located. The current size variable is set to the sum of the smallest S value located and the S value of the current row. S of the current row is set to the current size at step 94. L of the current row is adjusted downward at step 94 to stop the current match at the beginning of the "chunk" corresponding to the smallest S value located. All rows within the reverse extent of the current match are then skipped, after setting at step 96 all of their S values to the current size, and adjusting at step 98 their L values to reflect the new end of the current match. This entire process is repeated until the match table 26 is exhausted, as determined at step 82, and then stopped at step 84. That is, the entire table has been processed when the first row of the table has been processed.

Figure 7:
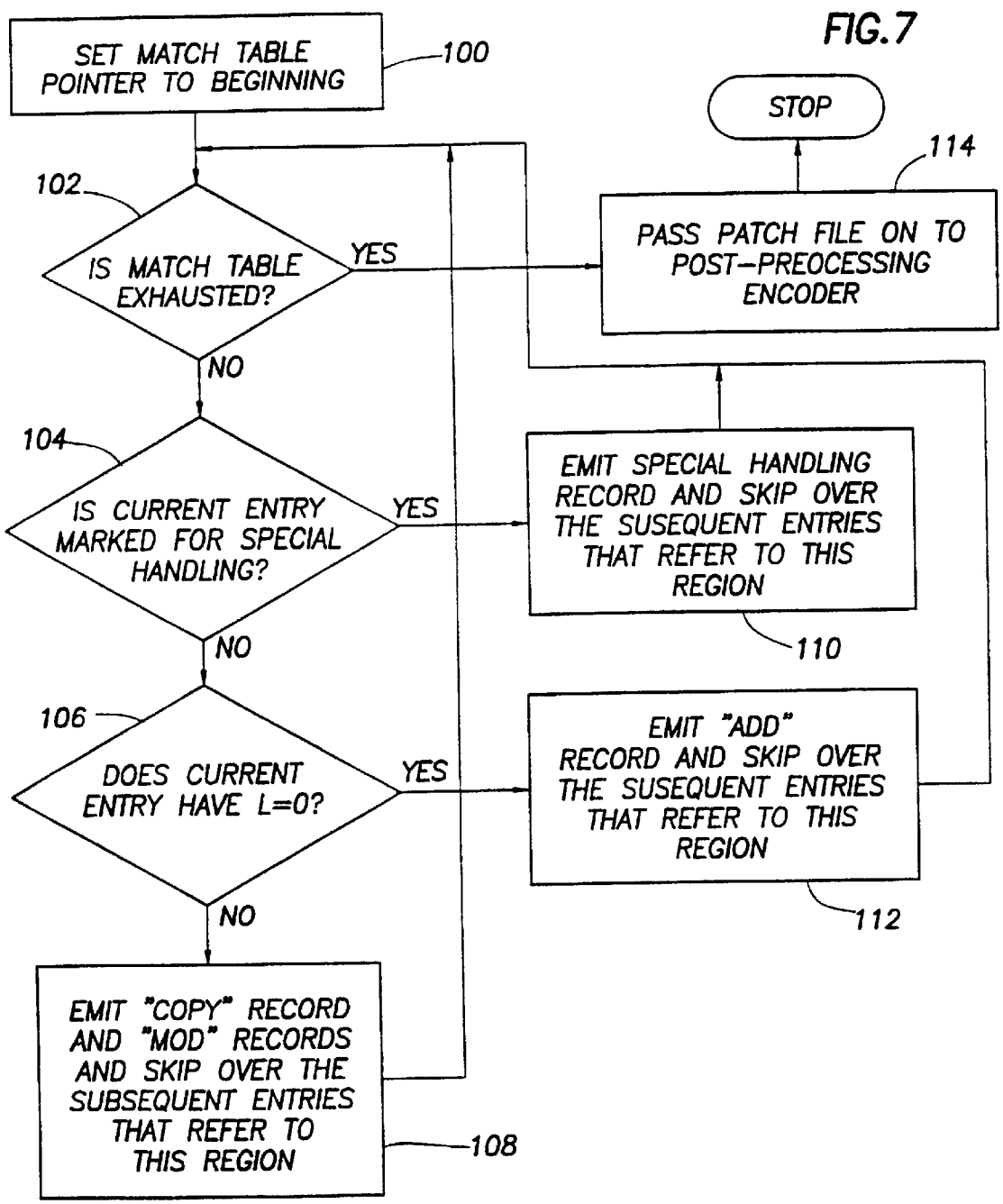
FIG. 7 is a patch file encoding flow chart.

FIG. 7 is a flowchart which describes, in detail, the patch file encoding method 18 illustrated in FIG. 2. This process takes the match table 26, OLD input file 20 and NEW input file 22 as inputs and produces the output patch file 36 as output. The method proceeds by first setting a pointer at step 100 and then passing the match table 26 in the forward direction by beginning at the row corresponding to the first "chunk" in the NEW input file 22, and examining each row in turn until that table is exhausted as indicated at step 102. As the various patch file records are processed, they are placed in a temporary storage means to be passed on at step 114 to the post-processing encoder at the end of the process, which is terminated at step 116. If the row is marked for special handling as determined at step 104, then a corresponding "special handling" record is generated. This may require examination of this region of the NEW input file 22. The immediately subsequent rows that correspond to "chunks" within the extent of the region covered by the special handling are skipped at step 110. If the row is not marked for special handling, but has an L value of zero as determined at step 106, then an "Add" record is generated at step 112, which requires examination of the corresponding region of the NEW input file 22. All immediately subsequent rows, that also have zero L values and that are not marked for special handling, are skipped. If, however, the current row is not marked for special handling and has a nonzero L value, then both the OLD input file 20 and the NEW input file 22 are examined to locate any mismatches in this (possibly approximate) matched region. In this case, "Copy" records and possible "mod" records are generated at step 108, and all immediately subsequent rows that correspond to "chunks" within the extent of this match are skipped. This entire process is repeated by returning to the step 102 until the match table 26 is exhausted by the processing of the last row of the table, as indicated by the check at the step 102. The patch file records in the temporary storage means are then passed to the post processing encoder at step 114 for final optimization and encoding. A preferred embodiment of this encoder is discussed in the "operation" section below. The post processing encoder then passes the completed output patch file 36 to the output means 28 shown in FIG. 2.

Operation

The following discussion describes the preferred operation of the invention. It should be understood, however, that there are alternate modes of operation which will yield desired results. There are a number of design parameters for the operation method that will impact the discussion of the method in various ways. These parameters will be defined, and the values for these parameters that are used in the preferred operational embodiment will be given.

1. "Chunk" size: This parameter controls the minimum match size as well as the granularity of the match table 26 and must be a power of 2. Increasing this value allows one to increase efficiency at the expense of effectiveness. The preferred embodiment is 8, but values of 4, 16, etc. are certainly reasonable.

2. Speed factor: This parameter controls the granularity of the string table 24. Increasing this value allows one to increase efficiency at the expense of effectiveness. The preferred embodiment uses user-selectable relative values between 0 and 10 inclusive.

3. Approximate-matching tolerance: These parameters control how closely two strings must coincide to be considered a "match." Altering these tolerances allows one to tailor the method for specific patterns of changes with different kinds of data. Two tolerances used in the preferred embodiment comprise a local tolerance and a global tolerance, where both are expressed as fractions. A local tolerance of 8/6 specifies that out of each 16 adjacent characters, 8 would be allowed to mismatch before the match was terminated. A global tolerance of 1/3 specifies that the total number of mismatches can be at most 1/3 of the total characters in the match. The preferred embodiment uses user-selectable pair values of local and global tolerances, respectively, of (8/16, 1/3) which are generally used with executable files, and (0/16, 0/1), which is generally used with text files. Note that the latter tolerance pair requires exact (as opposed to approximate) matching.

4. Chain length limits: This parameter controls the maximum number of identical key values that will be chained together in the string table 24. It is necessary to limit this for efficiency reasons. If no limit is placed on the length of a chain, then a file consisting entirely of repeating patterns degrades the efficiency of the match table preparation process (see FIG. 2) without helping its effectiveness. If the value for this limit is low, effectiveness suffers, since some potentially useful matches will not be found. The preferred embodiment uses a fixed value of 20 for this parameter, but values between 10 and 100 are certainly reasonable. Altering this parameter based on available memory size is also a potentially helpful ramification of the preferred embodiment.

5. Minimum special handling size: This parameter controls special handling block size to be eligible for special handling described below. The preferred embodiment uses a fixed size of 12 characters for this parameter.

6. Coding estimation parameters: These parameters control the estimates, used in the match table preparation and match table optimization, of the number of characters that will be taken to encode a given match. The preferred embodiment uses a fixed estimate of 6 characters plus 3 characters per mismatch in the forward direction.

Having described a representative set of operating parameters of the method shown in FIG. 2, the preferred embodiment of the patch file construction method and apparatus will be described in detail. The OLD input file 20 and NEW input file 22 are input by means of memory mapped files, which facilitates the particular access patterns used by the method. Namely, the method needs to access rapidly and repeatedly the current block of the OLD input file, while the NEW Input file is passed sequentially backward or forward. The match table 26 is also passed sequentially backward or forward so that it is also stored in a memory mapped file in mass storage. The string table 24 is stored in random access memory (RAM) and the RAM size determines how much of the OLD Input file may be processed at a time. The temporary patch file storage used for buffering the patch file before it is passed to the post processing encoder 114, as shown in FIG. 7, is a dedicated RAM with overflow to mass storage, since there is not any a priori limit on the size of this temporary patch file storage. The output patch file 28 is an ordinary sequential access file since this is adequate for the method.

The patch file construction method begins by acquiring the largest available memory block for use in storing the string table 25. The largest size of OLD Input file that can be processed into a string table of this size is then calculated. This becomes the size of the block of OLD input file that will be processed on each pass through the string table preparation and match table preparation shown in FIG. 2.

The string table preparation 12 depends greatly upon the details of the particular embodiment of the string table 24 that is selected. In the preferred embodiment, the string table 24 consists of a modified 8-way B-tree with linked list leaves as described above. The string table preparation process 12 is executed by then consists of the following steps:

Step 1. Place the OLD input file 20 pointer at the beginning of the portion to process, and initialize the B-tree to "empty."

Step 2. If the key (string of the same length as a "chunk") present at the input pointer is eligible for special handling, skip it and go to step 6.

Step 3. Lookup the key in the B-tree.

Step 4. If the key is not in the B-tree, insert it and begin an associated instance list.

Step 5. If the key is present in the B-tree and the associated instance list has not reached the maximum chain length, add this instance to the list.

Step 6. Add twice the speed factor plus one to the input pointer.

If there is still a key remaining in the portion to process, go back to step 2.

"Special Handling" in the preferred embodiment means that the key comprises either 8 repetitions of a single character, four repetitions of a two-character pattern or 2 repetitions of a four-character pattern. If this pattern continues for a total of at least 12 characters, then the block is eligible for special handling. Potentially helpful ramifications often include the addition of other types of special handling blocks.

Skipping by odd amounts in step 6 (when the "chunk" size is a power of 2) insures that a sufficiently long match will always be found, even though not every "chunk" in the OLD input file 20 is tabulated in the string table 24. As an example, if the speed factor is equal to 10, then only the keys whose positions are a multiple of 21 will be placed in the string table. If, however, an exact match between OLD and NEW files has a length of at least 91 characters, then this match will be located because at least one of the NEW "chunks" included in the match will exactly match a key from the OLD file placed in the string table.

The lookup and insertion procedures mentioned above are standard operations on a B-Tree as described, for example, in Knuth, *The Art of Computer Programming,* Vol. 3, and are hereby incorporated into this disclosure by reference. The method for associating a key value with an instance list pointer in the preferred embodiment of the string table 24 will, however, be described. Referring to FIG. 4, keys are located in three different types of nodes in the string table which are the root node 42, interior nodes 44 and leaf nodes 46. If a key is in a leaf node 46, it is clear where the corresponding instance list pointer is located in the corresponding L field of the same node. However, the keys in the root and interior nodes also have associated instance lists that are pointed to by the LP fields of various leaf nodes. The important fact to realize here is that there are always more leaf nodes than there are keys in all root and interior nodes combined. Specifically, one can begin at any key in a root or interior node and arrive at a unique leaf node by the following process: (1) proceed down the tree by moving "to the right" at the first stage by using the C field whose index is one greater than the index of the key, and (2) then taking C1 pointers until a leaf is reached. The LP field of this leaf node points to the instance list associated with the original key.

The match table preparation process was described above in the discussion of FIG. 5. To that description, details will be directed toward how to mark "chunks" in the match table 26 for special handling and how to mark a match in the match table. As mentioned above, special handling is indicated in the match table by certain reserved values in the RL field. The preferred embodiment reserves values above FFFFFF00 in hexadecimal to indicate various types of special handling: FFFFFF01, FFFFFF02, FFFFFF03 are used to indicate repeated characters, repeated two-character patterns and repeated four-character patterns respectively. The method allows other types of special handling.

To mark a match in the match table, the I field is set to the position in the OLD input file 20 that matches this "chunk," the L field is set to the maximum extent of the match in the forward direction (including the size of the base "chunk"), the RL field is set to the maximum extent of the match in the backward direction (not including the size of the base "chunk") and the S field is set to reflect the coding estimate derived from the number of mismatches in the forward extension (6 plus 3 times the number of mismatches in the preferred embodiment). Marking the match is completed by setting I of the previous row to I minus the "chunk" size, L of the previous row to L plus the "chunk" size, RL of the previous row to RL minus the "chunk" size, and S of the previous row to S. This process is repeated as long as RL is larger than the "chunk" size. The match table optimization 16 process was thoroughly described above in the discussion of FIG. 6.

The patch file encoding process 18 was described above in the description of FIG. 7. Details are now added concerning the encoding of the temporary patch file storage which is passed to the post processing encoder, as well as details of the preferred embodiment of the post processing encoder itself. The temporary patch file comprises a rectangular four-column array, with each row corresponding to a patch file record and comprising a code, a NEW file position, a length and a modifier. A code describes the record type and is one of the following values: 0 for "Copy," 1 for "Add," 2 for "Mod," 3 for "Special Handling 1," 4 for "Special Handling 2," 5 for "Special Handling 4." The NEW file position indicates the position in the NEW file to which this record pertains, and the length field indicates its length. The meaning of the modifier varies according to the value in the code field: for "Copy" records, it indicates the OLD file position from which the block is to be copied; for "Add" records it is unused; for "Mod" records it indicates the difference between the NEW file contents at that position and the OLD file contents that will have been copied into that position during patch application; for "Special Handling" records it indicates the 1-, 2-, or 4-character pattern that will be repeated through that region. This encoding (with minor variation) is also used for the auxiliary table 38 in the patch application process shown in FIG. 3.

Various optimizations are possible in the post processing encoder (See FIG. 7). The preferred embodiment performs the following steps:

Step 1. Sort all "Copy" and "Special Handling" records in increasing order by NEW file position.

Step 2. Add 10 to the Code field of any of these records that are not immediately preceded by a "Copy" or "Special Handling" record (these new codes represent "Copy With Gap," "Special Handling 1 With Gap," etc.)

Step 3. Form an array, which consists of packed forms of these records (specific formats are given below).

Step 4. Add to this array another record, which is a single record containing all "Mod" records in packed form, sorted in order by NEW File Position (specific format given below).

Step 5. Add to this array another record, which is a single record containing the actual characters from all of "Add" records, sorted in order by NEW File Position (specific format given below).

Step 6. Add to this array another record marking the end of the patch file (specific format given below).

Step 7. Pass this entire array to any general purpose data compression routine.

The preferred formats of all packed records are as follows. A "varindex" field is a variable-length encoding of a 32-bit unsigned integer (that is, an integer between 0 and 4,294, 967,295 inclusive) in which one character is used for magnitudes between 0 and 127 inclusive, two characters are used for magnitudes between 128 and 16,383 inclusive, three characters are used for magnitudes between 16,384 and 2,097,151 inclusive, four characters are used for magnitudes between 2,097,152 and 268,435,455 inclusive, and five characters are used for magnitudes between 268,435,456 and 4,294,967,295 inclusive. Specific formats are as follows:

Format for "End Of File":
  Code (16)
Format for "Copy":
  Code (0); OLD Position (varindex); length (varindex)
Format for "Copy With Gap":
  Code (10); Gap Size (varindex); OLD Position (varindex); length (varindex)
Format for "Special Handling 1":
  Code (3); Pattern (character); length (varindex)
Format for "Special Handling 1 With Gap":
  Code (13); Gap Size (varindex); Pattern (character); length (varindex)
Format for "Special Handling 2":
  Code (4); Pattern (two characters); length (varindex)
Format for "Special Handling 2 With Gap":
  Code (14); Gap Size (varindex); Pattern (two characters); length (varindex)
Format for "Special Handling 4":
  Code (5); Pattern (four characters); length (varindex)
Format for "Special Handling 4 With Gap":
  Code (15); Gap Size (varindex); Pattern (four characters); length (varindex)
Format for "Add":
  Code (1); Total Length (varindex); Characters
Format for "Mod":
  Code (2); Total Number of Mods (varindex); Diff1 (character);
  Pos. Inc1 (varindex); Diff2 (character; Pos. Inc2 (varindex; . . . Diffx (character); Pos. Incx (varindex)

In the last format, the "Diff" fields are the various amounts that must be added to a position to fix up a mismatch, and the "Pos. Inc" fields are the distances (position increments) between successive mismatches (Pos. Inc1 is the position of the first mismatch, Pos. Inc2 is the distance between the first and second mismatches, etc.).

More details on the "varindex" format follow:
  the 32 data bits of the quantity to be encoded will be denoted $X0\ X1\ X2\ \ldots\ X31$ (from least significant to most significant);
  quantities encoded in one character set $X7$ through $X31$ to zero;
  quantities encoded in two characters set $X14$ through $X31$ to zero, and at least one of $X7$ through $X13$ to nonzero;
  quantities encoded in three characters set $X21$ through $X31$ to zero and at least one of $X14$ through $X20$ to nonzero; and
  quantities encoded in four characters set $X28$ through $X31$ to zero and at least one of $X21$ through $X27$ to nonzero;
  quantities encoded in five characters set at least one of $X28$ through $X31$ to nonzero.

In the encoding to follow, successive characters in the encoding are delimited by a colon and, within a character, the bits are written from most significant to least significant. Then the encodings are as follows:

One character: 0 X6 X5 X4 X3 X2 X1 X0
Two characters: 10 X13 X12 X11 X10 X9 X8:X7 X6 X5 X4 X3 X2 X1
Three characters: 110 X20 X19 X18 X17 X16:X15 X14 X13 X12 X11 X9 X8: X7 X6 X5 X4 X3 X2 X1 X0
Four characters: 1110 X27 X26 X25 X24: X23 X22 X21 X20 X19 X18 X17 X16: X15 X14 X13 X12 X11 X10 X9 X8:X7 X6 X5 X4 X3 X2 X1 X0
Five characters: 11110000: X31 X30 X29 X28 X27 X26 X25 X24:X23 X22 X21 X20 X19 X18 X17 X16: X15 X14 X13 X12 X11 X10 X9 X8: X7 X6 X5 X4 X3 X2 X1 X0

Patch File Application

The preferred embodiment of the patch file application method and apparatus will now be described in more detail. According to FIGS. 1a, 1b and 3, the OLD input file 34 is input by means of a memory mapped file to facilitate the access patterns of the method, while the input patch file 36 is input via a normal sequential access file. The auxiliary table 38 is stored in RAM with overflow to mass storage, since there is no a priori limit on the size of this table. The Output NEW file 40 is built using a memory mapped file to facilitate the random access patterns needed.

Referring to FIG. 3, the patch file decoder 30 essentially accomplishes the reverse of the post processing encoder portion of the patch file encoder 18. That is, the pattern file decoder 30 decompresses the input patch file 36 and decodes it into the auxiliary table 38, which is formatted, in the preferred embodiment, exactly like the temporary patch file storage of the patch file encoder 18. More specifically, the auxiliary table 38 comprises a rectangular four-column array, with each row corresponding to a patch file record and comprising a code, a NEW file position, a length, and a modifier. The code describes the record type and is one of the following values: 0 for "Copy"; 1 for "Add"; 2 for "Mod"; 3 for "Special Handling 1"; 4 for "Special Handling 2"; and 5 for "Special Handling 4." The NEW file position indicates the position in the NEW file to which this record pertains and the length field indicates its length. The meaning of the modifier varies according to the value in the code field for:

"Copy" records, it indicates the OLD file position from which the block is to be copied;

"Add" records, it is unused;

"Mod" positions, it indicates the difference between the NEW file contents at that position and the OLD file contents that will have been copied into that position during patch application; and for "Special Handling" records, it indicates the 1-, 2-, or 4-character pattern that will be repeated through that region.

This auxiliary table 38, unlike the earlier table, is partitioned into separate sections for Copy/Special Handling, Add and Mod records. This decoding proceeds by the following steps:

Step 1. Decompression of the patch file.

Step 2. Decoding of the various patch file records, using the formats described above.

Step 3. Synthesizing the NEW file position for each record (see below for more details) and placing each decoded record into the appropriate partition of the auxiliary table 38.

It is to be noted that none of the records in the input patch file contains a NEW file position. Rather, the NEW file position for each record is implicated from the fact that all the Copy and Special handling records were packed into the patch file in order and any regions not covered by these records were indicated in various Gap sizes. To accomplish the synthesis of the NEW file positions, the following method is used:

Step 1. Initialize the current position and the total Gap Size to 0.

Step 2. Read a record. If it is an "Add" or a "Mod" or an "End Of File" then stop this process.

Step 3. If this record contains a Gap, then add an entry in the "Add" partition of the table with length equal to the Gap Size, and NEW file position equal to the current position. Add the Gap Size to the current position and to the total Gap Size.

Step 4. Add an entry to the "Copy/Special Handling" partition of the table with code, length and modifier taken from the record and NEW file position equal to the current position. Add the length to the Step 5. Go to Step 2.

When the above process is complete, the "Mod" record, if present, will be processed in a similar way. When the "Mod" record has been processed, the "Add" record is processed (if present) by adding one additional entry to the "Add" partition of the table, which has NEW file position equal to the current position and length to the difference between the size of the "Add" record and the total Gap Size computed earlier. At this point, the preferred embodiment begins the NEW file construction process 32.

The NEW File construction process reads the "Copy/Special Handling" partition of the auxiliary table 38 and performs all the indicated actions in order. Then it reads the "Mod" partition of the auxiliary table and performs all the indicated modifications. Finally, it reads the "Add" portion of the auxiliary table (in order) and placed the decompressed characters from the "Add" record (if present—these characters were not processed earlier) into the appropriate place in the Output NEW file 40.

At this point, the Output NEW file 40 is an exact duplicate of the Input NEW file 22 as illustrated in FIGS. 1a and 1b thereby accomplishing a stated object of the invention.

While the foregoing is directed to the preferred embodiments of the invention, the scope thereof is determined by the claims that follow.

What is claimed is:

1. A method for converting an OLD computer file into an updated NEW computer file, the method comprising the steps of:

(a) identifying differences between said OLD file and a NEW computer file by passing both files through a patch build program;

(b) creating a patch file based on identified differences, comprising the steps of
 (i) selecting a portion of said OLD file;
 (ii) processing said portion of OLD file with a string table preparation subroutine thereby creating a string table from said selected portion of OLD file;
 (iii) combining said portion of OLD file, said NEW file and said string table by a matchtable preparation subroutine thereby creating a match table having identified matches between said OLD file and said NEW file, wherein a selected number of mismatches are allowed;
 (iv) repeating steps (b(i)) through (b(iii)) until all portions of OLD file have been processed; and
 (v) combining said OLD file, said NEW file and said match table in a patch file encoding subroutine to create said patch file; and (c) combining said OLD file and said patch file by passing both files through a patch apply program to obtain said NEW file.

2. The method of claim 1 wherein said patch file is created from said OLD file at a central facility, and patch files are subsequently distributed to a plurality of remote facilities to convert a plurality of the OLD files into plural NEW files and including the additional steps of:

(a) creating an auxiliary table from said patch file with a patch file decoder subroutine; and (b) combining said auxiliary table, said OLD file and said patch file with a NEW file construction subroutine thereby generating a copy of said NEW file.

3. The method of claim 1 wherein said mach table subroutine comprises the additional steps of:

(a) successively selecting fixed-length substrings from the NEW file;

(b) utilizing the string table to find any matching copies of the selected sub strings in said OLD file portion; and (c) extending said matching substring copy to a longer match in the forward and reverse directions, wherein a selected number of mismatches are allowed.

4. The method of claim 1 wherein a string table is prepared from the OLD file by the steps:

(a) successively selecting fixed-length substrings from said portion of OLD file whose position relative to beginning of said OLD file portion is a multiple of a fixed increment, said fixed length and fixed increment having no common factors greater than one; and (b) if said selected substring does not comprise a repeating pattern, recording location of said selected sub strings in said string table.

5. The method of claim 4 wherein substrings which have already been recorded in said string table a fixed number of times are not recorded further in said string table until a subsequent portion of said OLD file is selected.

6. A computer readable program code for converting an OLD computer file into an updated NEW computer file, the program comprising:

(a) a NEW file template program which defines the form of said NEW file;

(b) a patch build program which identifies a difference
 (i) identifying a portion of said OLD file to be converted, and
 (ii) creating a patch file;

(c) a patch apply program which converts said OLD file into said NEW file by combining said patch file with said portion of the OLD file to be converted to form said NEW file;

(d) a string table memory receiving a string table from said OLD file formed by a string table subroutine;

(e) a match table memory for receiving the result of a match table subroutine which combines said OLD file, said NEW file and said string table to create a match table having identified matching regions between said OLD file and said NEW file, wherein a selected number of mismatches are allowed; and (f) a patch file encoding subroutine which combines said OLD file, said NEW file and said match table to create said patch file.

7. The computer readable program code of claim 6 further comprising:

(a) a patch file decoder subroutine which creates an auxiliary table from said patch file; and (b) a NEW file construction subroutine which combines said auxiliary table, said OLD file and said patch file for generating said NEW file.

8. The process of forming smaller patch files using the computer readable program code of claim 6 and comprising:

(a) inputting the OLD file to a string locating subroutine to collect a string table;

(b) inputting the string table into a match subroutine provided with the NEW input file to form a match table;

(c) collecting the matches from the table and non-matching regions from said NEW file to form a list of patches; and (d) encoding said patches into a patch file for sending to a plurality of remote locations so that the remote locations can use said patch apply program to convert OLD files to NEW files.

9. A method for controlling a general purpose computer, and causing it to compare an OLD binary file and a NEW binary file, to construct a patch file containing the differences between the OLD and NEW binary files, and subsequently controlling a remote different general purpose computer to use said patch file to reconstruct and output said NEW file from said OLD file comprising:

(a) a binary file input sequence enabling the OLD and NEW files to be accessed repeatedly and progressively;

(b) a string table subroutine forming stored data structures comprising a plurality of fixed-length substrings within a selected portion of said OLD file;

(c) applying the string table subroutine to successive portions of said OLD file so that the contents of said string table are constructed based on selected portions of said OLD file so that the LD file is completely input thereto;

(d) a match table for storing data structures describing matches between portions of the NEW file compared to the OLD file, wherein a selected number of mismatches are allowed;

(e) inputting to the match table the said NEW file partitioned into selected length substrings from the OLD file processed through the sting table wherein said substrings are extended to longer matches in either the forward or reverse directions;

(f) cyclically repeating string table preparation and match table preparation wherein repeated, successive portions of said first file are processed;

(g) optimizing the match table lengths of the matches to produce a patch file of smaller patches;

(h) forming a completed patch file for subsequent use;

(i) forming a binary computer file including the patch file from the data structures in the match table encoded into a binary computer file and transmitted to a patch file driven different computer; and (j) applying said patch file reconstruction to said OLD file with said encoded patch file.

10. The method of claim 9 wherein the step of forming the match table defines a substring match to occur when the ratio of total mismatched characters to total characters is less than a selected ratio, and no adjacent characters having a selected and fixed block size contains more mismatches than a fixed and selected value and said selected ratio and said selected value are input to control forming the matches.

11. The method of claim 9 wherein match table optimization proceeds by moving backwards through said NEW file by fixed increments, and progressively recording estimates of the number of characters required to encode said NEW file from that point forward to an end point, and adjusting the length of the match to minimize said estimate.

12. The method of claim 9 wherein said string table subroutine proceeds by placing into said string table data structures necessary to locate those substrings of said OLD file which have a fixed size and which begin at a location relative to the last selected portion which is a multiple of fixed length, and wherein said fixed length and fixed increment have no common factors greater than one and said increment is chosen from a plurality of choices.

13. The method of claim 9 wherein substrings of said OLD file comprising repeating patterns of a plurality of sizes are not input into said string table by said string table preparation method, and said fixed-length substrings of said NEW file comprising repeating patterns of a plurality of sizes are not processed by said match table preparation method, and repeating substrings are encoded separately into said patch file.

14. The method of claim 9 wherein said patch file encoding method proceeds by forming patch file records of a plurality of types, including:

(a) copy of records, wherein said completed patch file is instructed to append a copy of a region of said OLD file to reconstruction of NEW file, and comprising:
  (i) an identifying code;
  (ii) a location in said OLD file; and
  (iii) a length;

(b) copy with gap records, wherein said completed patch file is instructed to append a gap to said reconstruction of NEW file, records the position and length of said gap, and then append a copy of a region of said OLD file and comprising:
  (i) an identifying code;
  (ii) a gap size;
  (iii) a location in said OLD file; and
  (iv) a length;

(c) mismatch modification records, wherein said completed patch file is instructed to set a current modification position to the beginning of said reconstruction of NEW file, and then to modify certain individual characters in said reconstruction of NEW file, and comprising:
  (i) an identifying code;
  (ii) a modification count;
  (iii) a plurality of modification identifiers, comprising:
    (1) an increment which is to be added to said current modification position of said reconstruction of NEW file;
    (2) a difference which is added to the character at said modification position in said reconstruction of NEW file, and (d) add records, wherein said completed patch file is instructed to place indicated characters in previously recorded gaps in said reconstruction of NEW file and append any remaining characters to said reconstruction of NEW file, and comprising:

(i) an identifying code,
(ii) a length, and
(iii) characters to be placed is said gaps or appended to said reconstruction of NEW file.

15. The method and apparatus of claim 9, wherein said patch file encoding method proceeds by forming patch file records of plurality of types, including
   (a) copy records, wherein said patch application method is instructed to append a copy of a region of said OLD file to said reconstruction of NEW file, and comprising:
      (i) an identifying code,
      (ii) a location in said OLD file, and
      (iii) a length,
   (b) copy with gap records, wherein said completed patch file is instructed to append a gap to said reconstruction of NEW file, record the position and length of said gap, and then append a copy of a region of said OLD file to said reconstruction of NEW file, and comprising:
      (i) an identifying code,
      (ii) a gap size,
      (iii) a location in said OLD file, and
      (iv) a length,
   (c) pattern fill records, wherein said completed patch file is instructed to append to said reconstruction of NEW filled with a repeating pattern, comprising:
      (i) an identifying code, which also identifies length of said pattern,
      (ii) a pattern, and
      (iii) a length,
   (d) pattern fill with gap records, wherein said completed patch file is instructed to append a gap to reconstruction of NEW file, record the position and length of said gap and then append to said file a region filled with a repeating pattern, and comprising:
      (i) an identifying code, which also identifies length of said pattern,
      (ii) a gap size,
      (iii) a pattern, and
   (e) mismatch modification records, wherein said completed patch file is instructed to set a current modification position to the beginning of said reconstruction of NEW file, and then to modify certain individual characters in said reconstruction of NEW file, and comprising:
      (i) an identifying code,
      (ii) as modification count,
      (iii) a plurality of modification identifiers, comprising:
         (1) an increment which is to be added to said current modification position of said reconstruction of NEW file,
         (2) a difference which is added to the character at said modification position in said reconstruction of NEW file,
   (f) add records, wherein said completed patch file is instructed to place indicated characters in previously recorded gaps in said reconstruction of NEW file and appends any remaining characters to said reconstruction of NEW file, and comprising:
      (i) an identifying code,
      (ii) a length, and
      (iii) characters to be placed in said gaps or appended to said reconstruction of NEW file.

16. The method of claim 9 including the steps of:
   (a) forming the string table;
   (b) forming the match table;
   (c) forming the patch file derived from the string and match table; and
   (d) defining different measures of match in a match table subroutine so that the patch file is minimized in size.

17. The method of claim 16 including the steps of progressively building the match table by repeated processing of successive positions if the NEW file, and wherein repeated portions thereof are processed to completion.

18. The method of claim 17 wherein the match table encodes match position, number of matching symbols in sequence, and estimated number of symbols to encode the match.

19. Apparatus for controlling a general purpose computer to compare an OLD bring file and a NEW binary file, to construct a patch file containing the differences between said binary files, and subsequently enabling a general purpose providing with said patch file to construct said NEW file from said OLD file and patch file, comprising:
   (a) a file input means enabling the OLD and NEW files to be accessed repeatedly;
   (b) string table storage means storing data structures comprising a plurality of fixed-length substrings within a currently selected portion of said OLD file;
   (c) a string table preparation circuit selecting successive portions of said OLD file so that the contents of said string table storage means are constructed based on the currently selected portioned of said OLD file;
   (d) match table storage means storing data structures describing matches between regions of said OLD file and regions of said NEW file, wherein a selected number of mismatches are allowed;
   (e) a match table preparation circuit forming from the said NEW file fixed-length substrings located in said OLD file by structures stored in the string table means, and substrings are extended thereby to longer matches in the forward or reverse directions;
   (f) wherein said file input means drives said string table preparation circuit and said match table preparation circuit for repeated, successive portions of said OLD file, until all portions of said file are processed;
   (g) a match table optimization circuit controlling the lengths of the matches in the data structures in the match table storage means to produce a minimized patch file; and
   (h) patch file output means for patch file encoding so that the data structure in the match table storage means are encoded into a binary computer file and transmitted by said patch file output means.

20. The apparatus of claim 19 wherein said match table preparation circuit defines two substrings to match when the ratio of total characters is less than a selected proportion, and a block of adjacent characters contains fewer mismatches than a fixed value.

21. The apparatus of claim 19 wherein said match table optimization circuit proceeds by moving backwards through said NEW file by increments of a fixed size, and progressively makes and records estimates of the number of characters required to encode said NEW file from that point forward to the end, and adjusts the length of the match used to encode said block to minimize said estimate.

22. The apparatus of claim 19 wherein said string table preparation circuit processes data structures necessary to locate those substrings of said OLD file which have length equal to a fixed size and which begin at a location relative to said currently selected portion which is a multiple of a fixed increment, and wherein said fixed size and fixed increment have no common factors greater than one and said increment is selectable from a plurality of choices.

23. The apparatus of claim 19 wherein substrings of said OLD file comprising repeating patterns are not placed into said string table storage means, and said fixed-length substrings of said NEW file comprising repeating patterns of a plurality of sizes are not processed by said match table preparation circuit, but said repeating substrings are encoded separately into said patch file.

24. The apparatus of claim 19 wherein said patch file encoding proceeds by forming patch file records of a plurality of types, including:
   (a) copy records wherein said patch file output means is instructed to append a copy of a region of said OLD file to reconstruction of NEW file, and comprising:
      (i) an identifying code,
      (ii) a location in said OLD file, and
      (iii) a length;
   (b) copy with gap records wherein said patch file output means is instructed to append a gap to the reconstruction of NEW file, record the position and length of said gap, and then copy a region of said OLD file, to the reconstruction of said NEW file, and comprising:
      (i) an identifying code,
      (ii) a gap size,
      (iii) a location in said OLD file, and
      (iv) a length;
   (c) mismatch modification records, wherein said patch file output means is instructed to set a current modification position to the beginning of said reconstruction of NEW file and then to modify certain individual characters in said reconstruction of NEW file, comprising:
      (i) an identifying code,
      (ii) a modification count,
      (iii) a plurality of modification identifiers, comprising:
         (1) an increment which is to be added to said current modification position of said reconstruction of NEW file, and
         (2) a difference which is added to the character at said modification position in said reconstruction of NEW file;
   (d) add records wherein said patch file output means is instructed to place indicated characters in previously recorded gaps in said reconstruction of NEW file and appends any remaining characters to said reconstruction of NEW file, and comprising:
      (i) an identifying code,
      (ii) size
      (iii) characters to be placed in said gaps or appended to said reconstruction of NEW file.

25. A method of processing NEW and OLD files through a patch build program in a computer comprising the steps of:
   (a) building a string table from the OLD file processed from the start to the end thereof to compile strings therein;
   (b) using strings in the string table to make matches with NEW file wherein the matches are stored in a match table;
   (c) for each match in the match table preparing for each match values of I, RL, and S wherein I is match location, L is number of consecutive approximately matching characters in the forward direction, RL is number of consecutive matching characters in the reverse direction, and S is estimated number of characters required to encode the match, wherein a selected number of mismatches are allowed;
   (d) progressively changing the values of L to find the longest match.

26. The method of claim 25 wherein the matches in the match table are progressively and dynamically changed by:
   (a) adding to L an adjacent chunk of the OLD file;
   (b) modifying S dependent on the added chunk;
   (c) re-evaluating the value of L after steps (a) and (b) to obtain new values I, L, RI and S; and
   (d) optimizing the match table by re-evaluating matches therein so that the entire table is processed by the repeated steps (a) and (b) until there are no remaining adjacent chunks to process.

27. The method claim 26 wherein match table optimization is dependent on chunk size and including the steps of changing chunk size.

28. The method of claim 27 wherein chunk size is increased by doubling the size.

29. A method for controlling a general purpose computer to progressively compare an OLD binary file with a NEW binary file, and construct a patch file containing the differences between the OLD and NEW binary files, and to enable subsequent operation of a remote and different general purpose computer to use said patch file to reconstruct and output said NEW file from said OLD file and comprising the steps of:
   (a) forming a string table of stored data structures comprising a plurality of entries therein;
   (b) evaluating a selected portion of said OLD file so that the contents of said string table are constructed based on selected portions of said OLD file;
   (c) forming a match table for storing data structures describing matches between portions of the NEW file compared to the OLD file and inputting to the match table the stored data structures, wherein a selected number of mismatches are allowed;
   (d) cyclically repeating string table and match table formation wherein repeated, successive entries into said tables are optimized in match table lengths to produce a patch file of selected sizes; and
   (e) forming a completed patch file for subsequent use from the data structures in the match table encoded into a binary computer file to be transmitted as a patch file for a remote computer to enable patch file reconstruction of said OLD file with said transmitted patch file.

30. The method of claim 29 including the step of forming the string table from the OLD file by processing the OLD file progressively using selected portions of the OLD file, forming the match table by inputting all of the NEW file for match table formation, and progressively extending match table and string table formation wherein initial matches in the match table overlap other matches, and extending the process until match overlap ends.

31. The method of claim 29 including the step of forming the match table initially with a set of stored data structures describing matches, and subsequently refining the matches in an iterative process.

32. The method of claim 29 including the step of forming the match table by serially processing the entire NEW file to completion, and thereafter optimizing the match table to reduce the size of the patch file.

33. The method of claim 29 including the step of forming the patch file as a data stream stored on a memory media.

34. The product made by the method of claim 33.

35. The product made by the remote computer when provided with the patch file of claim 29 and the OLD file and which comprises the NEW file data stream.

36. The method of claim 29 wherein said string table is formed by locating repeated patterns in said OLD file, and forming the match table initially with matches wherein the matches are progressively refined while reducing the patch file size.

37. The method of claim 29 including the repeated step of evaluating the OLD file until the entire OLD file is evaluated, and including the step of evaluating the entire NEW file for matches with the entire OLD file.

38. The method of claim 37 including the step of completing the match table with the NEW file, and optimizing the match table overlapping the step of completing the match table.

* * * * *